US010965621B2

(12) United States Patent
Cui et al.

(10) Patent No.: US 10,965,621 B2
(45) Date of Patent: Mar. 30, 2021

(54) APPLICATION-BASED MULTIPLE RADIO ACCESS TECHNOLOGY AND PLATFORM CONTROL USING SDN

(71) Applicant: AT&T Intellectual Property I, L.P., Atlanta, GA (US)

(72) Inventors: Zhi Cui, Sugar Hill, GA (US); Jiansong Wang, Parlin, NJ (US); Thomas A. Anschutz, Conyers, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 75 days.

(21) Appl. No.: 15/379,891

(22) Filed: Dec. 15, 2016

(65) Prior Publication Data
US 2018/0176143 A1 Jun. 21, 2018

(51) Int. Cl.
H04L 12/931 (2013.01)
H04W 4/70 (2018.01)

(52) U.S. Cl.
CPC .............. H04L 49/70 (2013.01); H04W 4/70 (2018.02)

(58) Field of Classification Search
CPC .................................. H04L 49/70; H04W 4/70
See application file for complete search history.

(56) References Cited

U.S. PATENT DOCUMENTS 7,003,298 B1* 2/2006 Jagadeesan ........... H04W 76/22
455/442
8,295,187 B1* 10/2012 Toole ..................... H04L 43/18
370/234
9,313,129 B2 4/2016 Ganichev et al.
9,319,375 B2 4/2016 Gross, IV et al.
9,350,696 B2 5/2016 Zhang et al.
9,369,426 B2 6/2016 Koponen et al.
9,455,901 B2 9/2016 Davie et al.
2002/0136233 A1* 9/2002 Chen ................. H04W 72/1215
370/445
2008/0002638 A1* 1/2008 Saarela ................. H04W 88/06
370/338

(Continued)

OTHER PUBLICATIONS

Sadasivarao et al., "Open Transport Switch—A Software Defined Networking Architecture for Transport Networks," Proceedings of the Second ACM SIGCOMM Workshop on Hot Topics in Software Defined Networking, Aug. 16, 2013, pp. 115-120, ACM.

(Continued)

Primary Examiner — Gregory B Sefcheck
Assistant Examiner — Joshua Smith
(74) Attorney, Agent, or Firm — Hartman & Citrin LLC

(57) ABSTRACT

Concepts and technologies disclosed herein are directed to application-based multiple radio access technologies ("RAT") and platform control using software-defined networking ("SDN"). According to one aspect of the concepts and technologies disclosed herein, an SDN controller can configure a radio access network ("RAN") for connectionless services and for connection-oriented services. The RAN can support multiple RATs each capable of providing radio access to a device, such as a UE or an IoT device. The SDN controller can determine a user plane path configuration for an application flow through at least part of the RAN. The SDN controller can provide the user plane configuration to an SDN agent that is stored on and is executable by the device.

16 Claims, 7 Drawing Sheets

(56) References Cited

U.S. PATENT DOCUMENTS

| | | | | |
|---|---|---|---|---|
| 2012/0120857 A1* | 5/2012 | Sudak | | H04W 52/0216 370/311 |
| 2014/0219094 A1* | 8/2014 | Kampmann | | H04L 45/64 370/235 |
| 2014/0286336 A1* | 9/2014 | Narayanan | | H04L 49/25 370/392 |
| 2015/0105122 A1* | 4/2015 | Wei | | H04W 24/04 455/553.1 |
| 2015/0180769 A1 | 6/2015 | Wang et al. | | |
| 2015/0244617 A1* | 8/2015 | Nakil | | H04L 43/0852 709/224 |
| 2015/0263867 A1* | 9/2015 | Chen | | H04L 12/4641 370/401 |
| 2015/0304158 A1* | 10/2015 | Dharmadhikari | | H04L 41/046 714/37 |
| 2016/0065422 A1* | 3/2016 | Khargharia | | H04L 45/30 370/412 |
| 2016/0119256 A1* | 4/2016 | Wang | | H04L 12/6418 370/401 |
| 2016/0127230 A1 | 5/2016 | Cui et al. | | |
| 2016/0197824 A1* | 7/2016 | Lin | | H04L 45/38 370/389 |
| 2016/0241436 A1 | 8/2016 | Fourie et al. | | |
| 2017/0142010 A1* | 5/2017 | Mathew | | H04L 12/6418 |
| 2017/0164349 A1* | 6/2017 | Zhu | | H04W 76/11 |
| 2017/0187686 A1* | 6/2017 | Shaikh | | H04L 63/0263 |
| 2017/0251352 A1* | 8/2017 | Drevo | | H04W 12/06 |
| 2018/0129539 A1* | 5/2018 | Sadat | | H04L 9/0825 |
| 2018/0227224 A1* | 8/2018 | Bhaskar | | H04L 45/02 |

OTHER PUBLICATIONS

Nascimento et al., "Virtual Routers as a Service: The RouteFlow Approach Leveraging Software-Defined Networks," Proceedings of the 6$^{th}$ International Conference on Future Internet Technologies, Jun. 13-15, 2011, ACM.

Huang et al., "High-Fidelity Switch Models for Software-Defined Network Emulation," Proceedings of the Second ACM SIGCOMM Workshop on Hot Topics in Software Defined Networking, Aug. 16, 2013, ACM.

* cited by examiner

APPLICATION-BASED MULTIPLE RADIO ACCESS TECHNOLOGY AND PLATFORM CONTROL USING SDN

BACKGROUND

Mobile network traffic has been growing at a very fast pace. In addition, the variation of network end points, the variation of applications, and the variation of mobility states of user equipment ("UE") (e.g., whether or not a UE is moving, and if so, how fast) are growing, and this trend will likely continue, particularly as 5G technologies are deployed. 5G technologies will support divergent types of end devices. Some of these end devices will be simple devices, such as meter readers and other Internet of Things ("IoT") and machine-to-machine ("M2M") devices, and some of these end devices will be more complex devices, such as smartphones, that support a wide variety of applications, such as voice calling, video calling, virtual private networking, gaming, multimedia streaming, and the like. Moreover, the evolution to 5G networks will embrace a mosaic of radio access technologies ("RATs"). IoT/M2M devices also can utilize wireline access for concurrent access and/or backup. While existing general packet radio service ("GPRS") tunneling protocol ("GTP") tunnel and bearer concepts may still have a role in supporting some applications and devices, these concepts might not be the best solution for all application and devices, such as IoT/M2M devices and the applications these devices support. This is in part because these concepts are based upon a connection-oriented architecture and will not scale well in networks that adopt the aforementioned new paradigm in which billions of IoT/M2M end points will be deployed.

SUMMARY

Concepts and technologies disclosed herein are directed to application-based multiple RAT ("multi-RAT") and platform control using SDN. According to one aspect of the concepts and technologies disclosed herein, an SDN controller can configure a radio access network ("RAN") for connectionless services and for connection-oriented services. The RAN can support multiple RATs, each capable of providing radio access to a device, such as a UE or an IoT device. The SDN controller can determine a user plane path configuration for an application flow through at least part of the RAN. The SDN controller can provide the user plane configuration to an SDN agent that is associated with and is enforceable by the device.

In some embodiments, the SDN controller can configure the RAN by performing network slicing of the RAN into a first network slice that includes first resources to support the connectionless services. The SDN controller can configure the RAN by performing network slicing of the RAN into a second network slice that includes second resources to support the connection-oriented services.

In some embodiments, the SDN controller can determine the user plane path configuration based, at least in part, upon an overall network view and a rule. The user plane path configuration can specify how the application flow should be routed through a portion of the RAN that supports a specific RAT of the multiple RATs. The user plane path configuration also can specify how the application flow should be routed through the portion of the radio access network via a specific frequency spectrum. The user plane path configuration also can specify how the application flow should be routed through either the first network slice or the second network slice.

In some embodiments, the SDN controller can determine the user plane path configuration, at least in part, by negotiating with the SDN agent that is associated with and is enforceable by the device. The SDN agent can establish, based upon negotiations with the SDN controller, a local table. The SDN agent can use the local table to determine how to route packets for an application instance that utilizes the application flow.

In some embodiments, the SDN controller can provide the user plane path configuration to an SDN component to configure the SDN component to support the application flow. The SDN controller, in some embodiments, can determine, based upon the user plane path configuration, a service edge configuration. The SDN controller can provide the service edge configuration to a further SDN component to serve as a service edge component.

In some embodiments, the SDN agent can determine how to route the packet for the application instance that utilizes the application flow based, at least in part, upon a network condition, a device condition, or a combination thereof. The network condition, in some embodiments, can be or can include a congestion state of one or more cells provided by the RAN. The device condition, in some embodiments, can be or can include a user preference and/or a device mobility state, such as whether the device is moving and, if so, how fast.

In some embodiments, access can be concurrent over multiple paths. In these embodiments, one or more of the paths can be facilitated, at least in part, by a wireline connection. The SDN controller's control can extend to frontend and backhaul networks for wireless and equivalents for wireline access. The SDN controller's control can extend similarly at the device side of the access link(s). A single application flow can be routed across multiple RATs and wireline in order to combine bandwidth for a single flow.

In some embodiments, the SDN controller only directs the RAN and backhaul networks and does not involve the device, which is instead manipulated using protocols other than SDN. For example, if the device has multiple connections and possible paths for an application flow to take, SDN in the RAN can be used to drop packets along the path that the application should not take, and standard protocols can discover and use another path.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to application-based multiple RAT and platform control using SDN. More particularly, the concepts and technologies disclosed herein define, at least in part, an SDN-based framework for a per-application flow-based intelligent routing by using enhanced SDN and Open vSwitch ("OVS") protocols on various IP devices. The IP devices can deploy an SDN agent/client locally. The SDN agent/client can communicate with an SDN controller to negotiate which type of user plane path should be configured (i.e., a connectionless path or a connection-oriented path), what RAT would be best suited for the IP device at a given time, and what radio spectrum would provide the highest efficiency and benefits. Moreover, the concepts and technologies disclosed herein provide a foundation upon which to deliver application flows through an effective access network infrastructure based upon extended match-action rules, such as dynamic network policies, device mobility states, user preferences, application preferences, some combination thereof, and/or the like.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
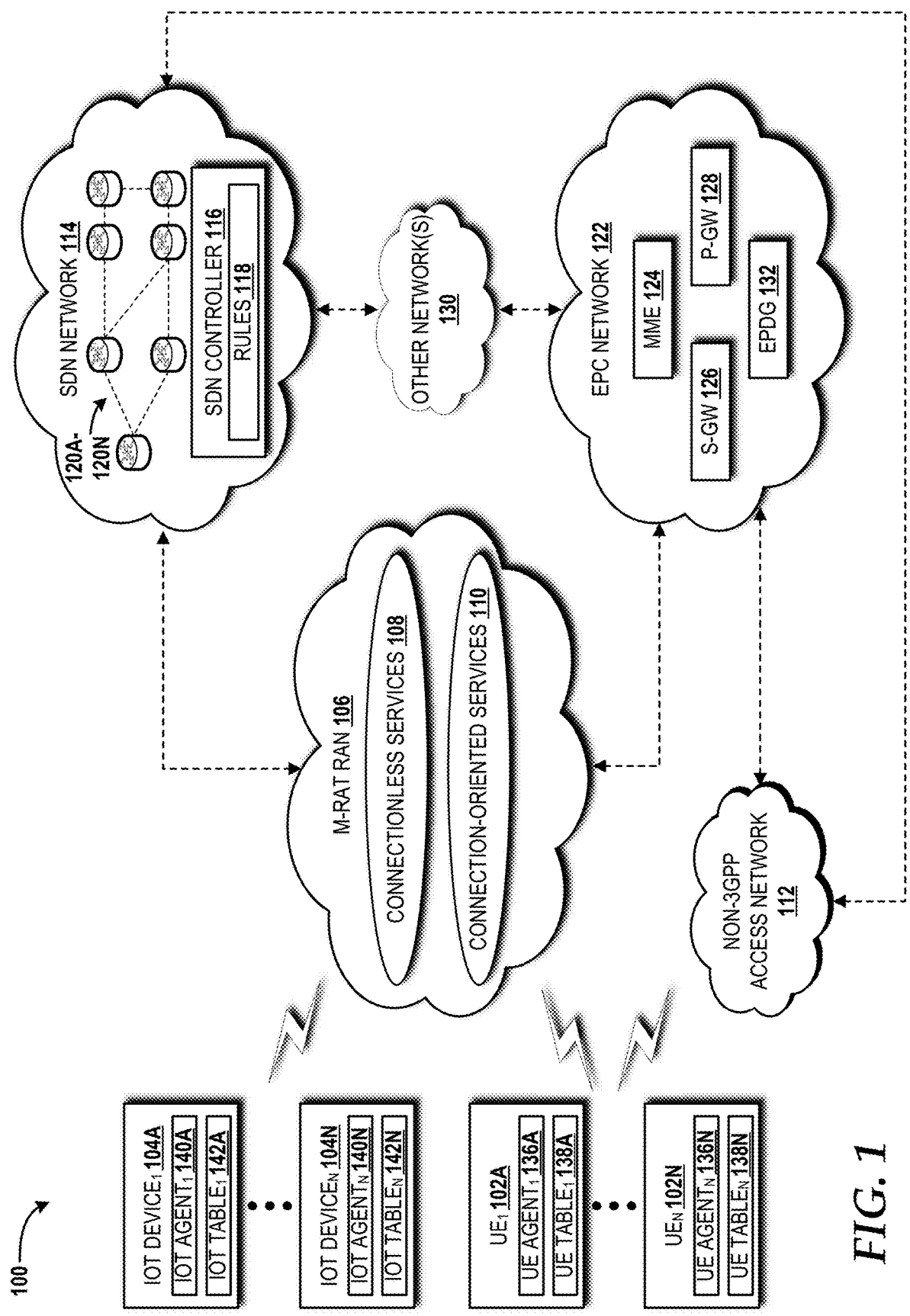
FIG. 1 is a block diagram illustrating an operating environment in which aspects of the concepts and technologies disclosed herein can be implemented.

Turning now to FIG. 1, a block diagram illustrating an operating environment 100 in which aspects of the concepts and technologies disclosed herein can be implemented. The operating environment 100 includes a plurality of user equipment devices ("UEs") 102A-102N (referred to herein collectively as UEs 102, or in the singular form as UE 102) and a plurality of IoT devices 104A-104N (referred to herein collectively as IoT devices 104, or in the singular form as IoT device 104) operating in communication with a radio access network ("RAN") that supports multiple RATs ("M-RAT RAN") 106. The UEs 102 and the IoT devices 104 can communicate with the M-RAT RAN 106 via an air/radio interface provided by one or more eNodeBs ("eNBs") (not shown).

The M-RAT RAN 106 is shown as supporting both connectionless services 108 and connection-oriented services 110. As used herein, a "connectionless service" is any service that allows a terminal or node (such as a UE 102, an IoT device 104, and/or other devices and systems disclosed herein) to send data packets to a destination without establishing a connection to the destination. As also used herein, a "connection-oriented service" is any service that requires a terminal or node (such as the UE 102 or the IoT device 104) to establish a connection between service peers prior to any data being exchanged.

Each of the UEs 102 can be a cellular phone, a feature phone, a smartphone, a mobile computing device, a tablet computing device, a portable television, a portable video game console, or the like capable of communicating with the M-RAT RAN 106. Each of the UEs 102 can be associated with a mobility state that specifies whether a UE 102 is moving or not, and if so, whether the speed at which the UE 102 is moving might be indicative of a user associated with the UE 102 walking, riding in a vehicle, or the like. The concepts and technologies disclosed herein can take into account device conditions, such as a device's mobility state, as will be explained in further detail herein. Other conditions can include user preferences, for example.

Each of the IoT devices 104 can be a device that is network addressable to facilitate interconnectivity for the exchange of data. As such, the IoT devices 104 can be or can include any "thing" that is configured to be network addressable so as to connect to and communicate with one or more networks, such as the M-RAT RAN 106, over which to communicate with other connected devices, including, for example, the UEs 102, computers, smartphones, tablets, vehicles, other IoT devices, servers, other networks, the Internet, combinations thereof, and the like. Moreover, the IoT devices 104 can be deployed for consumer use, business use, and can find application in many industry-specific use cases. For example, the IoT devices 104 may find at least partial application in the following industries: automotive; energy; healthcare; industrial; retail; and smart buildings/homes. Those skilled in the art will appreciate the applicability of IoT-solutions to other industries as well as consumer and business use cases. For this reason, applications of the IoT devices 104 described herein are used merely to illustrate some example applications of the IoT devices 104, and therefore should not be construed as being limiting in any way. The IoT devices 104 can benefit from a connectionless mobility architecture framework using SDN and IP protocols that provide the connectionless services 108. This connectionless mobility architecture framework can eliminate the need for complex GTP tunnels and provide a simplified mobile network connectivity solution to the IoT devices 104, many of which are stationary and do not require the additional functionality provided through the mobility architecture designed to support the connection-oriented services 110.

The M-RAT RAN 106 can include one or more service areas ("cells") having the same or different cell sizes, which may be represented by different cell-types. As used herein, a "cell" refers to a geographical area that is served by one or more base stations operating within an access network. The cells within the M-RAT RAN 106 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, and a white space network cell-type. For ease of explanation, a "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated. The UEs 102 and the IoT devices 104 are shown as being in communication with one RAN (i.e., the M-RAT RAN 106), but the UEs 102 and/or the IoT devices 104 may be in communication with any number of access networks, including one or more non-3GPP access networks 112, such as a WI-FI access network. In some embodiments, the UEs 102 and/or the IoT devices 104 can be multi-mode devices, and as such, can communicate with the multiple RATs provided through the M-RAT RAN 106 and/or one or more RATs provided through the M-RAT RAN 106 and the non-3GPP access network 112. Moreover, in some embodiments, the IoT devices 104 can communicate with a low power wide area network ("LPWAN") operating as part of the M-RAT RAN 106.

The M-RAT RAN 106 can operate in accordance with one or more RATs that utilize mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The M-RAT RAN 106 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102 and the IoT devices 104. Data communications can be provided in part by the M-RAT RAN 106 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the M-RAT RAN 106 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. In some embodiments, the M-RAT RAN 106 is or includes one or more virtual RANs ("vRANs").

The non-3GPP access network 112 can include a plurality of wireless access points ("APs") (not shown). The non-3GPP access network 112 can operate in accordance with one or more Institute of Electrical and Electronic Engineers ("IEEE") 802.11 standards, such as, for example, IEEE 802.11a, 802.11b, 802.11g, 802.11n, 802.1ac and/or future 802.11 standards (referred to herein collectively as "WI-FI"). Draft 802.11 standards are also contemplated. In some implementations, the UEs 102 and/or the IoT devices 104 connect to a WI-FI network via one or more secure connections, each of which may utilize an encryption technology, such as, but not limited to, WI-FI Protected Access ("WPA"), WPA2, Wired Equivalent Privacy ("WEP"), and/or the like.

As used herein, a "base station" refers to a radio receiver and/or transmitter (collectively, transceiver) that is/are configured to provide a radio/air interface over which one or more of the UEs 102 and the IoT devices 104, can connect to a network, such as the M-RAT RAN 106 and/or the non-3GPP access network 112. Accordingly, a base station is intended to encompass one or more base transceiver stations ("BTSs"), one or more NBs, one or more eNBs, one or more home eNBs, one or more wireless APs, one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102 and the IoT devices 104.

The M-RAT RAN 106 and the non-3GPP access network 112 are shown as being in communication with an SDN network 114. The SDN network 114 is a network implemented in accordance with SDN concepts. SDN is an architectural framework for creating intelligent networks that are programmable, application-aware, and more open. SDN provides an agile and cost-effective communications platform for handling the dramatic increase in data traffic on carrier networks by providing a high degree of scalability, security, and flexibility. SDN provides several benefits. SDNs can allow for the creation of multiple, virtual network control planes on common hardware. SDN can help extend service virtualization and software control into many existing network elements. SDN enables applications to request and manipulate services provided by the network and allow the network to expose network states back to the applications. SDN exposes network capabilities through application programming interfaces ("APIs"), making the control of network equipment remotely accessible and modifiable via third-party software clients, using open protocols such as OpenFlow, available from Open Network Forum ("ONF"). 3GPP and other standards bodies and industry forums are currently working to standardize SDN for use in multiple aspects of future mobile telecommunications networks under 5G standards. An illustrative network functions virtualization platform ("NFVP") upon which the SDN concepts described herein can be implanted is described herein below with reference to FIG. 7. In addition to SDN, the concepts and technologies disclosed herein can utilize Open-Flow vSwitch ("OVS") to route application flows as will be described herein below.

The illustrated SDN network 114 includes an SDN controller 116. The SDN controller 116 can, on-demand, allocate resources to the M-RAT RAN 106. The SDN controller 116 can be configured to support any access networks, such as the M-RAT RAN 106 and the non-3GPP access network 112. The SDN controller 116 can support the connectionless services 108 through a connectionless-based native IP protocol. According to embodiments, the SDN controller 116 can utilize one or more rules 118 that specify the type of user plane path that should be configured (i.e., connectionless vs. connection-oriented), the RAT that would be best for a given device at a given time, and the radio spectrum that should be utilized to provide the most efficiency and benefits. Each of the rules 118 can include 5-tuples of the IP transport protocols, application instances, service requirements, active network policies, UE mobility state, user preference, the like, or some combination thereof.

The SDN controller 116 is in communication with a plurality of SDN components 120A-120N (referred to herein collectively as SDN components 120, or in the singular form as SDN component 120). The SDN components 120 can include one or more routers, one or more switches, one or more gateways, or some combination thereof. In some embodiments, the SDN components 120 utilize OpenFlow protocols and function as OpenFlow switches or OpenFlow routers, although the concepts and technologies disclosed herein are not limited to OpenFlow protocols. The SDN components 120, in some embodiments, can provide, at least in part, an SDN evolved packet core ("EPC") network. An SDN EPC network provides core network functions in accordance with 3GPP standards specifications and implemented via the SDN network 114 using the SDN components 120 and at the control of the SDN controller 116. Accordingly, an SDN EPC network can include one or more routers, one or more switches, one or more mobility management entity ("MMEs"), one or more serving gateways ("S-GWs"), one or more packet data network gateways ("P-GWs"), one or more combination S-GW/P-GWs, one or more home subscriber servers ("HSSs"), one or more policy and charging rules functions ("PCRFs"), one or more DIAMETER routing agents ("DRAs"), one or more DIAMETER edge agents ("DEAs"), one or more evolved packet data gateways ("EPDGs"), or any combination thereof. The illustrated operating environment 100 also includes an EPC network 122.

The SDN components 120 can include one or more SDN MMEs. The EPC network 122 also can include one or more MMEs 124. The MME(s) 124 (or SDN MME) can be configured in accordance with 3GPP standards specifications. An MME, in general, can perform operations to control signaling traffic related to mobility and security for access to the M-RAT RAN 106.

The SDN components 120 can include one or more SDN S-GWs. The EPC network 122 also can include one or more S-GWs 126. The S-GW(s) 126 (or SDN S-GW) can be configured in accordance with 3GPP standards specifications. An S-GW (or SDN S-GW) provides a point of interconnect between the radio-side (e.g., the M-RAT RAN 106) and an EPC network, such as an SDN EPC network created by the SDN components 120 or the EPC network 122. An S-GW serves the UEs 102 and the IoT devices 104 by routing incoming and outgoing IP packets.

The SDN components 120 can include one or more SDN P-GWs. The EPC network 122 also can include one or more P-GWs 128. The P-GW 128 (or an SDN P-GW) can be configured in accordance with 3GPP standards specifications. A P-GW (or SDN P-GW) also interconnects an EPC network, such as an SDN EPC network created by the SDN components 120 or the EPC network 122 to one or more external IP networks, such as, for example, one or more other networks 130, including other public land mobile networks ("PLMNs"), PDNs (e.g., the Internet), circuit-switched networks, and the like. A P-GW routes IP packets to and from other network(s). A PGW also performs operations such as IP address/IP prefix allocation, policy control, and charging.

The SDN components 120 can include one or more HSSs. The EPC network 122 also can include one or more HSSs (not shown). An HSS (or SDN HSS) can be configured in accordance with 3GPP standards specifications. An HSS is a database that contains user-related information for users of devices, such as the UE 102. An HSS can provide support functions to one or more MMES for mobility management, call and session setup, user authentication, and access authorization.

The SDN components 120 can include one or more PCRFs. The EPC network 122 also can include one or more PCRFs (not shown). A PCRF (or SDN PCRF) can be configured in accordance with 3GPP standards specifications. A PCRF can determine policy rules, detect service data flows, enforce policies, and perform flow-based charging.

The SDN components 120 can include one or more DRAs. The EPC network 122 also can include one or more DRAs (not shown). A DRA (or SDN DRA) can be configured in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in an EPC network.

The SDN components 120 can include one or more DEAs. The EPC network 122 also can include one or more DEAs (not shown). A DEA (or SDN DEA) can be configured in accordance with 3GPP standards specifications. A DEA provides a point of contact into and out of an EPC core network at the DIAMETER application level. A DEA provides secure communications to connect an EPC network to other network(s) to facilitate internetwork signaling operations (e.g., roaming, charging, and billing), for example, between home and visited PLMN. A DEA can enable DIAMETER signaling traffic to flow core networks while also disguising the topology of the core networks to one another.

The SDN components 120 can include one or more SDN evolved packet data gateways ("ePDGs"). The EPC network also can include one or more EPDGs 132, which interface with the P-GW 128 to provide the UEs 102 and/or the IoT devices 104 access to the EPC network 122 from untrusted non-3GPP access networks. The ePDG 132 functions as a security gateway to provide network security and interworking control via IPSec tunnel establishment based upon information obtained during 3GPP AAA procedures.

Returning to the UEs 102, the illustrated UEi 102A can store, in memory (best shown in FIG. 5), a UE AGENT$_1$ 136A and a UE TABLE$_1$ 138A; and the illustrated UE$_N$ 102N can store, in memory (best shown in FIG. 5), a UE AGENT$_N$ 136N and a UE TABLE$_N$ 138N. The UEs 102A-102N can execute, via one or more processors (also best shown in FIG. 5) the UE AGENTs 136A-136N to communicate with the SDN controller 116 on behalf of the device/user to negotiate, configure, and maintain the UE TABLES 138A-138N on the UEs 102A-102N to deliver application flows through the optimal RAT by either a connectionless or a connection-oriented user plane path. An application flow is used herein to describe the transmission of data by a particular application executing on a UE 102 or IoT DEVICE 104. In some embodiments, OVS can perform the actual routing of the application flows to different RATs available via the M-RAT RAN 106, based upon dynamically provisioned flow delivery rules used by the UE AGENTs 136A-136N. These rules can be the same as or similar to the rules 118, but specified from the perspective of the UE AGENTs 136A-136N. These rules can take into account, for example, RAT, a desired radio slice, and which user plane path (i.e., connectionless vs. connection-oriented transport services) should be utilized. The flow delivery rules used by the UE AGENTs 136A-136N can account for other variables. As such, the example variables noted above should not be construed as being limiting in any way.

Similar to the UEs 102, the illustrated IoT DEVICE$_1$ 104A can store, in memory (best shown in FIG. 5), an IoT AGENT$_1$ 140A and an IoT TABLE$_1$ 142A; and the illustrated IoT DEVICE$_N$ 104N can store, in memory (best shown in FIG. 5), an IoT AGENT$_N$ 140N and an IoT TABLE$_N$ 142N. The IoT DEVICES 104A-104N can execute, via one or more processors (also best shown in FIG. 5) the IoT AGENTs 140A-140N to communicate with the SDN controller 116 on behalf of the device/user to negotiate, configure, and maintain the IoT TABLES 142A-142N on the IoT DEVICEs 104A-104N to deliver application flows through the optimal RAT by either a connectionless or a connection-oriented application flow path. In some embodiments, OVS can perform the actual routing of the application flows to different RATs available via the M-RAT RAN 106, based upon dynamically provisioned flow delivery rules used by the IoT AGENTs 140A-140N. These rules can be the same as or similar to the rules 118, but specified from the perspective of the IoT AGENTs 140A-140N. These rules can take into account, for example, RAT, a desired radio slice, and which user plane protocol (i.e., connectionless vs. connection-oriented transport services) should be utilized. The flow delivery rules used by the IoT AGENTs 140A-140N can account for other variables. As such, the example variables noted above should not be construed as being limiting in any way.

The SDN controller 116 can configure the M-RAT RAN 106 via network slicing to create a network slice including resources dedicated to the connectionless services 108 and another network slice including resources dedicated to the connection-oriented services 110. As used herein, network slicing is an enabler for operators to optimize performance for both user traffic and operator network based upon application and service requirements on a shared network/infrastructure. Network slicing is a predominant feature of 5G network technologies since 5G is capable of supporting services that have different network requirements. For example, it is possible to slice a network into a connectionless slice on which stationary IoT devices and mobile broadband devices operate, and to slice the network into a connection-oriented slice on which devices that utilize voice services operate.

Based upon an overall network view of the network resources available and the rules 118, the SDN controller 116 can dynamically provide a configuration regarding how each application flow should be routed through the appropriate RAT, frequency spectrum, and network slice to the UE AGENTs 136A-136N and/or to the IoT AGENTs 140A-140N via a protocol such as OPENFLOW using the rules 118 to configure the UE tables 138 and the IoT tables 142 (e.g., flow→radio port, frequency slice, etc.).

The SDN controller 116 can perform additional functions. For example, the SDN controller 116 can forward user plane path configurations to network elements, including, for example, OpenFlow switches and routers operating within the connectionless infrastructure. The SDN controller 116 can optimize network resource allocation. The SDN controller 116 can optionally provide service edge configurations regarding which switch and/or router should perform service edge functions for which applications, and how to route user packets to the service edge.

The UE AGENTs 136 and the IoT AGENTs 140 can negotiate user plane path configurations with the SDN controller 116, and based upon these negotiations, can establish and maintain the UE tables 138 and the IoT tables 142. In addition, the UE AGENTs 136 and the IoT AGENTs 140 can measure network conditions (e.g., the congestion state of one or more cells of the M-RAT RAN 106) and device-related conditions (e.g., user preference, device mobility state, and/or the like). Based upon the network conditions and the device conditions, the UE AGENTs 136 and the IoT AGENTs 140 can direct application flows in accordance with the UE TABLES 138 and the IoT TABLES 142, respectively.

In some embodiments, access can be concurrent over multiple paths. In these embodiments, one or more of the paths can be facilitated, at least in part, by a wireline connection. The SDN controller's 116 control can extend to frontend and backhaul networks for wireless and equivalents for wireline access. The SDN controller's 116 control can extend similarly at the device side of the access link(s). A single application flow can be routed across multiple RATs and wireline in order to combine bandwidth for a single flow.

FIG. 1 illustrates one M-RAT RAN 106, one non-3GPP access network 112, one SDN network 114, one SDN controller 116, one EPC network 122, one MME 124, one S-GW 126, one P-GW 128, and one EPDG 132. It should be understood, however, that various implementations of the operating environment 100 include multiple M-RAT RANs 106, multiple non-3GPP access networks 112, multiple SDN networks 114, multiple SDN controllers 116, multiple EPC networks 122, multiple MMES 124, multiple S-GWs 126, multiple P-GWs 128, and/or multiple EPDGs 132. As such, the illustrated embodiment should be understood as being illustrative, and should not be construed as being limiting in any way.

Figure 2:
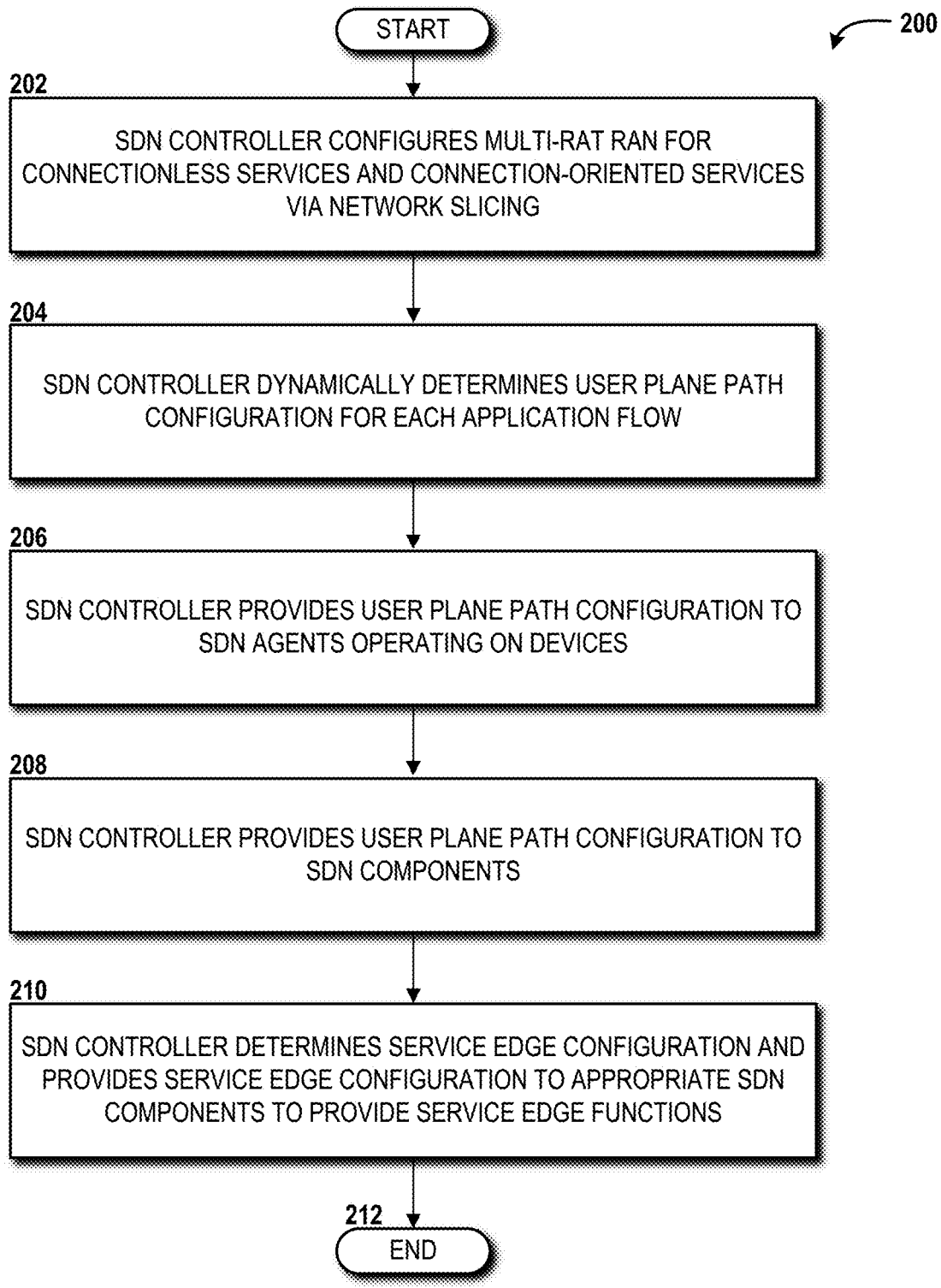
FIG. 2 is a flow diagram illustrating a method performed by a software-defined networking ("SDN") controller for application-based multi-RAT and platform control using SDN concepts, according to an illustrative embodiment.

Turning now to FIG. 2, aspects of a method 200 performed by the SDN controller 116 for application-based multi-RAT and platform control using SDN concepts will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multi-processor systems, distributed computing systems, mini-computers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described with reference to FIG. 2 and further reference to FIG. 1. Moreover, the operations of the method 200 will be described as being performed by the SDN controller 116. These operations can be performed via execution, by one or more processors (best shown in FIG. 4), of one or more software program modules (also best shown in FIG. 4) or applications.

The method 200 begins and proceeds to operation 202, where the SDN controller 116 can configure the multi-RAT RAN 106 for the connectionless services 108 and the connection-oriented services 110 via network slicing. In some embodiments, the SDN controller 116 can perform network slicing of the multi-RAT RAN 106 into a first network slice that can include first resources dedicated to providing, at least in part, the connectionless services 108. In some embodiments, the SDN controller 116 can perform network slicing of the multi-RAT RAN 106 into a second network slice that can include second resources dedicated to providing, at least in part, the connection-oriented services 110.

From operation 202, the method 200 proceeds to operation 204, where the SDN controller 116 can dynamically determine a user plane path configuration for each application flow through at least part of the multi-RAT RAN 106. In some embodiments, the SDN controller 116 can determine the user plane path, at least in part, through negotiations with SDN agents, such as one or more of the UE AGENTs 136 and/or one or more of the IoT AGENTs 140. The SDN controller 116 can determine the user plane path configuration for a given application flow based upon an overall network view of the network resources available and based upon one or more of the rules 118. The SDN controller 116 can provide the rule(s) 118 about what to do for given application(s). The user plane path configuration can specify how an application flow should be routed through at least a portion of the multi-RAT RAN 106 that supports a specific RAT. The user plane path configuration can specify how an application flow should be routed through at least a portion of the multi-RAT RAN 106 that supports a specific frequency spectrum. The user plane path configuration can specify how an application flow should be routed through either the first network slice or the second network slice.

From operation 204, the method 200 proceeds to operation 206, where the SDN controller 116 provides the user plane path configuration(s) determined at operation 204 to one or more SDN agents, such as one or more of the UE AGENTs 136 and/or one or more of the IoT AGENTs 140. From operation 206, the method 200 proceeds to operation 208, where the SDN controller 116 provides the user plane path configuration(s) to one or more of the SDN components 120 to support the application flow(s). In some embodiments, the SDN controller 116 can utilize an interface (e.g., OPENFLOW) to configure the data plane elements, such as a switch/router, such that based on criteria (e.g., application, 5-tuple, etc.) forward the packets to this egress port.

From operation 208, the method 200 proceeds to operation 210, where the SDN controller 116 determines a service edge configuration to be utilized by one or more of the SDN components 120 operating at the service edge and provides the service edge configuration to one or more of the SDN components 120 to provide service edge functions for the connectionless services 108 and the connection-oriented services 110. From operation 210, the method 200 proceeds to operation 212, where the method 200 ends.

Figure 3:
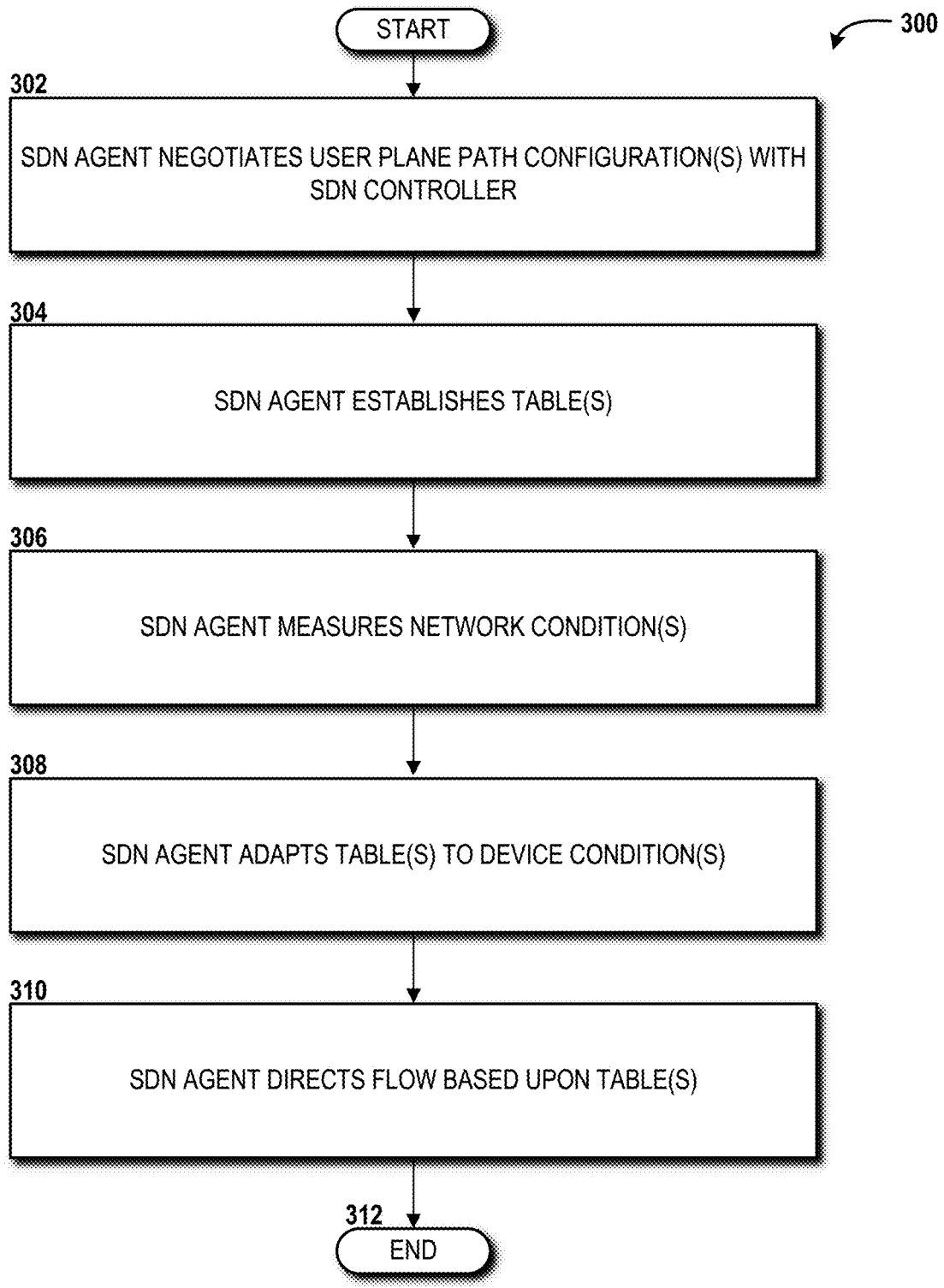
FIG. 3 is a flow diagram illustrating a method performed by an SDN agent for application-based multi-RAT and platform control using SDN concepts, according to an illustrative embodiment.

Turning now to FIG. 3, aspects of a method 300 performed by an SDN agent, such as the UE AGENT 136 or the IoT AGENT 140, for application-based multi-RAT and platform control using SDN concepts will be described, according to an illustrative embodiment. The method 300 will be described with reference to FIG. 3 and further reference to FIG. 1. Moreover, the operations of the method 300 will be described as being performed by one or more of the UEs. These operations can be performed via execution, by one or more processors (best shown in FIG. 5), of the UE AGENT 136 or the IoT AGENT 140.

The method 300 begins and proceeds to operation 302, where the SDN agent negotiates one or more user plane path configurations with the SDN controller 116. The UE AGENT 136 has more knowledge about UE-specific information (e.g. battery status, user preference, radio network condition, and/or the like). Thus, even though the SDN controller 116 provides general guidance about how to route the application, the UE AGENT 136 has the ability to negotiate with the SDN controller 116 and provides feedback to the SDN controller 116 about its condition for the SDN controller 116 to provide dynamic updates on the routing configuration to the UE 102.

From operation 302, the method 300 proceeds to operation 304, where the SDN agent establishes the table(s)—i.e., the UE table 138 and/or the IoT table 142. The UE table 138 and/or the IoT table 142 can include information that maps specific applications to specific ports. For example, application A can be mapped to port X (corresponding to a radio on a connectionless slice); application B can be mapped to port Y (corresponding to another radio on a connectionless slice); and application C can be mapped to port Z (corresponding to a radio on a connection-oriented slice).

From operation 304, the method 300 proceeds to operation 306, where the SDN agent measures network conditions. In some embodiments, the network conditions can include a congestion level of the M-RAT RAN 106.

From operation 306, the method 300 proceeds to operation 308, where the SDN agent adapts the table(s) to device conditions. The device conditions can include, for example, a mobility state of device and/or user preferences. For example, based on the conditions detected by the device, optimization can be achieved, via either communicating with the SDN controller 116 and obtaining a dynamically updated configuration rule, or the SDN controller 116 can have conditional rules (e.g., if radio congestion state is >90%, route application to a different RAN). The SDN agent on the device can dynamically choose the radio based on the network congestion information it receives from the radio network.

From operation 308, the method 300 proceeds to operation 310, where the SDN agent directs application flow based upon the table(s). From operation 310, the method proceeds to operation 312, where the method 300 ends.

Figure 4:
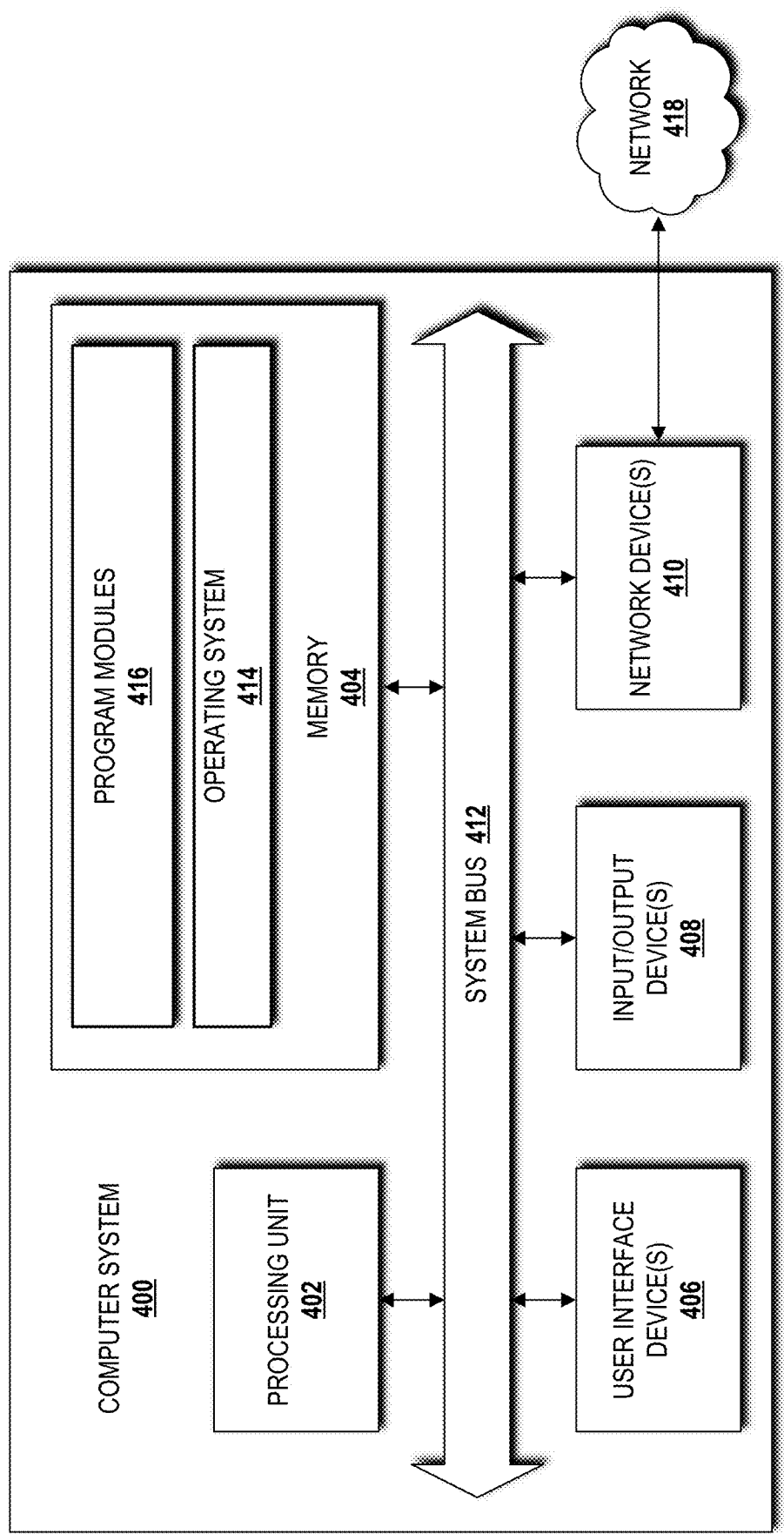
FIG. 4 is a block diagram illustrating an example computer system capable of implementing aspects of the embodiments presented herein.

Turning now to FIG. 4, a block diagram illustrating a computer system 400 configured to provide the functionality in accordance with various embodiments of the concepts and technologies disclosed herein will be described. The systems, devices, and other components disclosed herein, such as, for example, the UEs 102, the IoT devices 104, the SDN controller 116, the SDN components 120, the MME 124, the S-GW 126, the P-GW 128, the EPDG 132, and/or any other components disclosed herein, or any combination thereof, can utilize or can execute upon, at least in part, an architecture that is the same as or at least similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 416 may include various software and/or program modules to perform the various operations described herein, some of which can be based upon the rules 118. The program modules 416 and/or other programs can be embodied in computer-readable media containing instructions that, when executed by the processing unit 402, perform various operations such as those described herein. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium" and variations thereof does not include waves or signals per se and/or communication media.

The user interface devices 406 may include one or more devices with which a user accesses the computer system 400. The user interface devices 406 may include, but are not limited to, computers, servers, PDAs, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer. In some embodiments, the I/O devices 408 can be used for manual controls for operations to exercise under certain emergency situations.

The network devices 410 enable the computer system 400 to communicate with other networks or remote systems via a network 418. Examples of the network devices 410 include, but are not limited to, a modem, a radio frequency ("RF") or infrared ("IR") transceiver, a telephonic interface, a bridge, a router, or a network card. The network 418 may be or may include a wireless network such as, but not limited to, a WLAN, a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 418 may be or may include a wired network such as, but not limited to, a Wide Area Network ("WAN"), a wired Personal Area Network ("PAN"), or a wired Metropolitan Area Network ("MAN"). The network 418 can be or can include any of the networks described herein, such as the M-RAT RAN 106, the non-3GPP access network 112, the SDN network 114, the EPC network 122, the other network(s) 130, and/or any combination thereof.

Figure 5:
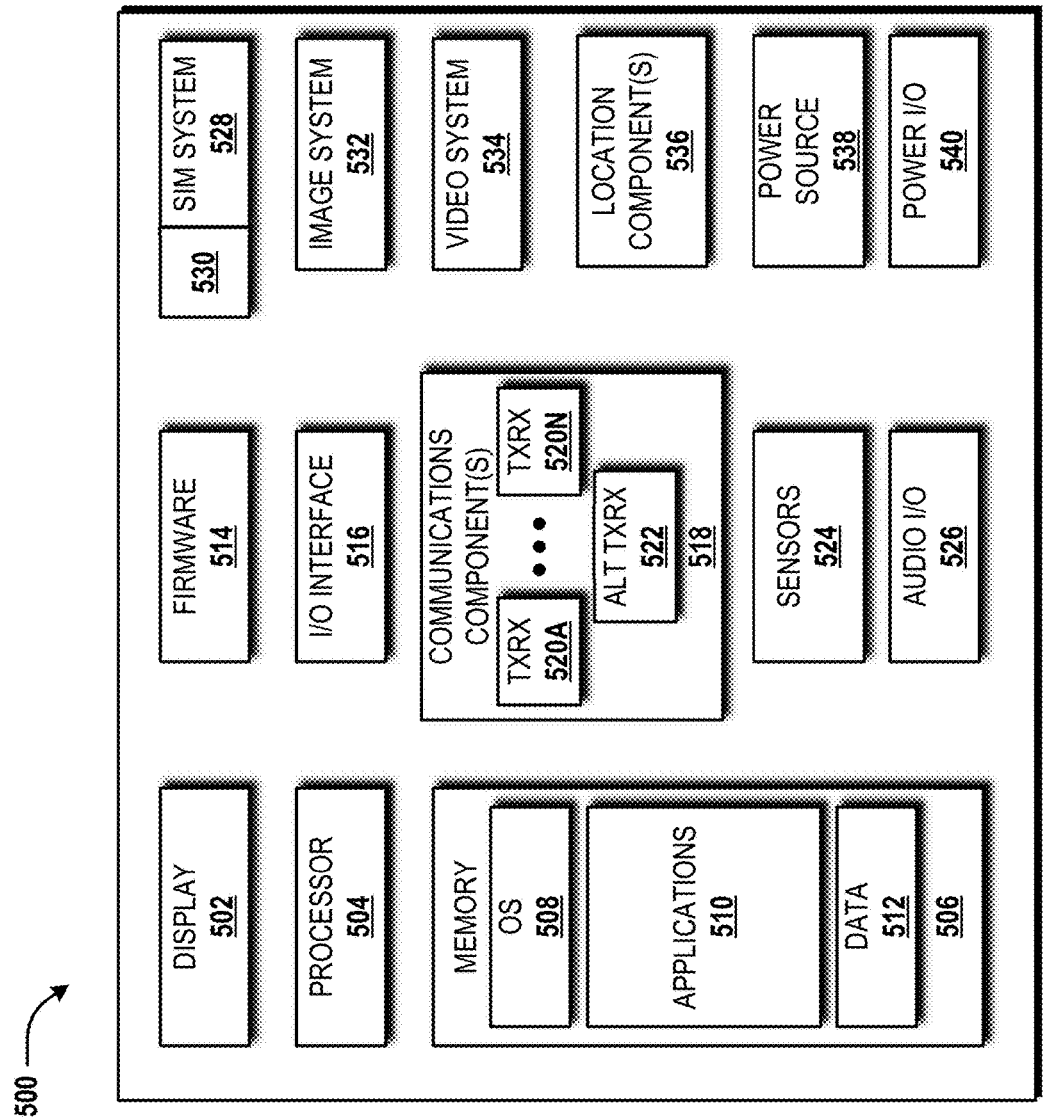
FIG. 5 is a block diagram illustrating an example mobile device capable of implementing aspects of the embodiments disclosed herein.

Turning now to FIG. 5, a block diagram illustrating an example mobile device 500, according to an illustrative embodiment will be described. In some embodiments, one or more of the UEs 102 and/or one or more of the IoT devices 104 (shown in FIG. 1) can be configured like the mobile device 500. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5). The applications 510 also can include the UE AGENTs 136 or the IoT AGENTs 140.

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. The data 512 can include the UE TABLEs 138 or the IoT TABLES 142. The data 512 also can include, for example, one or more identifiers, and/or other applications or program modules. According to various embodiments, the data 512 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using GSM, CDMA ONE, CDMA2000, LTE, and various other 2G, 2.5G, 3G, 4G, 5G, and greater generation technology standards, such as those described herein above as the RATs and the ad-hoc RATs. Moreover, the communications component 518 may facilitate communications over various channel access methods (which may or may not be used by the aforementioned standards) including, but not limited to, TDMA, FDMA, W-CDMA, Orthogonal Frequency-Division Multiplexing ("OFDM"), Space-Division Multiple Access ("SDMA"), and the like.

In addition, the communications component 518 may facilitate data communications GPRS, EDGE, the HSPA protocol family including HSDPA, EUL or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
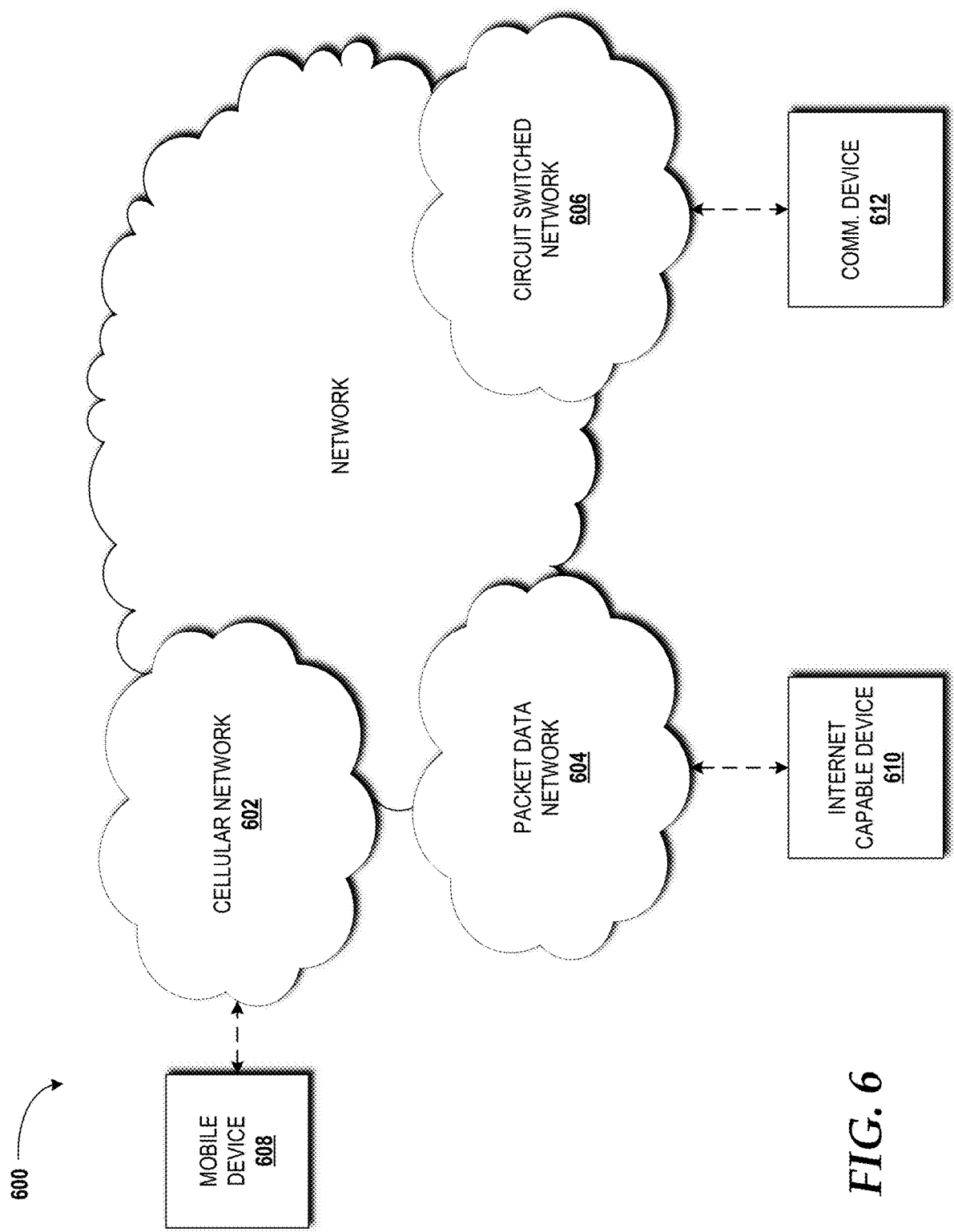
FIG. 6 is a block diagram schematically illustrating a network, according to an illustrative embodiment.

Turning now to FIG. 6, a schematic illustration of a network 600 will be described, according to an illustrative embodiment. The network 600 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, the UE 102, the IoT device 104, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards as well as evolved and future mobile standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 600 is used to refer broadly to any combination of the networks 602, 604, 606. It should be appreciated that substantially all of the functionality described with reference to the network 600 can be performed by the cellular network 602, the packet data network 604, and/or the circuit switched network 606, alone or in combination with other networks, network elements, and the like. The network 600 can include the functionality of any of the networks described herein.

Figure 7:
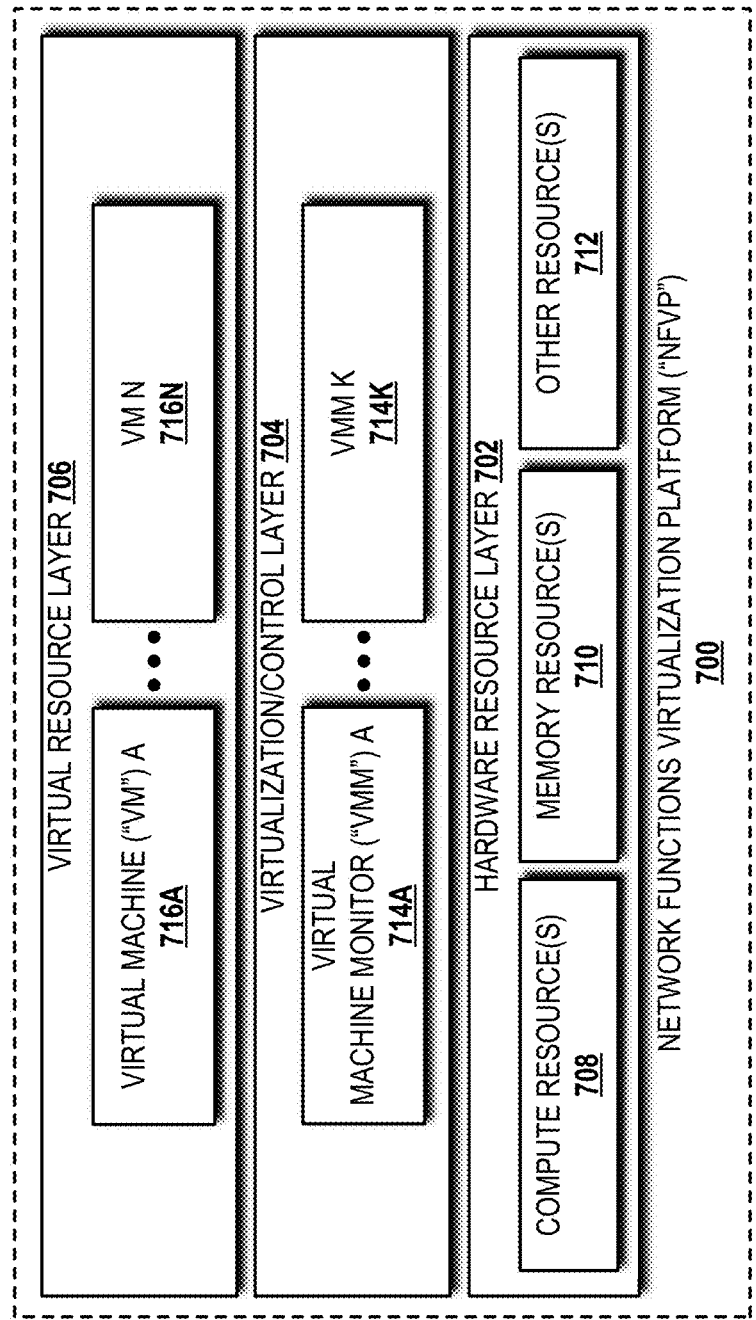
FIG. 7 is a block diagram illustrating an example network functions virtualization platform ("NFVP") capable of implementing aspects of the embodiments presented herein.

Turning now to FIG. 7, a network functions virtualization platform ("NFVP") 700 will be described, according to an exemplary embodiment. The architecture of the NFVP 700 can be used to implement VNFs as virtual counterparts to physical network functions disclosed herein. The NFVP 700 can be utilized to implement, at least in part, components of the M-RAT RAN 106, the SDN network 114 and/or the SDN components 120. The NFVP 700 is a shared infrastructure that can support multiple services and network applications. The illustrated NFVP 700 includes a hardware resource layer 702, a virtualization/control layer 704, and a virtual resource layer 706 that work together to perform operations as will be described in detail herein.

The hardware resource layer 702 provides hardware resources, which, in the illustrated embodiment, include one or more compute resources 708, one or more memory resources 710, and one or more other resources 712. The compute resource(s) 708 can include one or more hardware components that perform computations to process data, and/or to execute computer-executable instructions of one or more application programs, operating systems, and/or other software. The compute resources 708 can include one or more central processing units ("CPUs") configured with one or more processing cores. The compute resources 708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 708 can include one or more discrete GPUs. In some other embodiments, the compute resources 708 can include CPU and GPU components that are configured in accordance with a co-processing CPU/GPU computing model, wherein the sequential part of an application executes on the CPU and the computationally-intensive part is accelerated by the GPU. The compute resources 708 can include one or more system-on-chip ("SoC") components along with one or more other components, including, for example, one or more of the memory resources 710, and/or one or more of the other resources 712. In some embodiments, the compute resources 708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 708 can be or can include one or more hardware components architected in accordance with an ARM architecture, available for license from ARM HOLDINGS of Cambridge, United Kingdom. Alternatively, the compute resources 708 can be or can include one or more hardware components architected in accordance with an x89 architecture, such an architecture available from INTEL CORPORATION of Mountain View, Calif., and others. Those skilled in the art will appreciate the implementation of the compute resources 708 can utilize various computation architectures, and as such, the compute resources 708 should not be construed as being limited to any particular computation architecture or combination of computation architectures, including those explicitly disclosed herein.

The memory resource(s) 710 can include one or more hardware components that perform storage operations, including temporary or permanent storage operations. In some embodiments, the memory resource(s) 710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 708.

The other resource(s) 712 can include any other hardware resources that can be utilized by the compute resources(s) 708 and/or the memory resource(s) 710 to perform operations described herein. The other resource(s) 712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 714A-714K (also known as "hypervisors;" hereinafter "VMMs 714") operating within the virtualization/control layer 704 to manage one or more virtual resources that reside in the virtual resource layer 706. The VMMs 714 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716"). Each of the VMs 716 can execute one or more software applications, such as, for example, software application including instructions to implement, at least in part, one or more components of the SDN network 114—for example, the SDN controller 116 and/or the SDN components 120.

Based on the foregoing, it should be appreciated that concepts and technologies directed to application-based multiple RAT and platform control using SDN have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
configuring, by an SDN controller, a first portion of a plurality of resources of a radio access network into a first network slice to support connectionless services;
configuring, by the SDN controller, at least a second portion of the plurality of resources of the radio access network into a second network slice to support connection-oriented services;
determining, by the SDN controller, a user plane path configuration for an application flow through at least part of the radio access network, wherein determining the user plane path configuration for the application flow comprises negotiating the user plane path configuration between the SDN controller and an SDN agent stored locally in a memory of an end device, and wherein the SDN agent establishes, as part of the negotiating, a local table that is useable by the SDN agent, at least in part, to determine how to route packets for an application instance that utilizes the application flow;
providing, by the SDN controller, the user plane path configuration to the SDN agent; and
providing, by the SDN controller, the user plane path configuration to an SDN component to configure the SDN component to support the application flow based upon the user plane path configuration.

2. The method of claim 1, wherein determining, by the SDN controller, the user plane path configuration comprises determining, by the SDN controller, the user plane path configuration further based, at least in part, upon an overall network view and a rule.

3. The method of claim 1, further comprising determining, by the SDN controller, based upon the user plane path configuration, a service edge configuration; and providing, by the SDN controller, the service edge configuration to a further SDN component to configure the further SDN component as a service edge component.

4. The method of claim 1, further comprising determining, by the SDN agent, how to route the packets for the application instance that utilizes the application flow based, at least in part, upon a network condition, a device condition, or both a network condition and a device condition.

5. The method of claim 1, wherein the end device comprises a user equipment.

6. The method of claim 5, wherein the SDN agent comprises a user equipment client.

7. The method of claim 1, wherein the end device comprises an Internet of Things device.

8. The method of claim 7, wherein the SDN agent comprises an Internet of Things client.

9. The method of claim 1, further comprising adapting, by the SDN agent, the local table to a device condition.

10. The method of claim 9, wherein the device condition comprises a mobility state of the end device.

11. The method of claim 9, wherein the device condition comprises a user preference.

12. An SDN controller comprising:
a processor; and
a memory that stores instructions that, when executed by the processor, cause the processor to perform operations comprising
configuring a first portion of a plurality of resources of a radio access network into a first network slice to support connectionless services,
configuring at least a second portion of the plurality of resources of the radio access network into a second network slice to support connection-oriented services,
determining a user plane path configuration for an application flow through at least part of the radio access network, wherein determining the user plane path configuration for the application flow comprises negotiating the user plane path configuration between the SDN controller and an SDN agent stored locally in a memory of an end device, and wherein the SDN agent establishes, as part of the negotiating, a local table that is useable by the SDN agent, at least in part, to determine how to route packets for an application instance that utilizes the application flow,
providing the user plane path configuration to the SDN agent, and
providing the user plane path configuration to an SDN component to configure the SDN component to support the application flow based upon the user plane path configuration.

13. The SDN controller of claim 12, wherein determining the user plane path configuration comprises determining the user plane path configuration further based, at least in part, upon an overall network view and a rule.

14. The SDN controller of claim 12, wherein the operations further comprise:
determining, based upon the user plane path configuration, a service edge configuration; and
providing the service edge configuration to a further SDN component to configure the further SDN component as a service edge component.

15. A computer-readable storage medium having instructions stored herein that, when executed by a processor of an SDN controller, cause the processor to perform operations comprising:
configuring a first portion of a plurality of resources of a radio access network into a first network slice to support connectionless services,
configuring at least a second portion of the plurality of resources of the radio access network into a second network slice to support connection-oriented services;
determining a user plane path configuration for an application flow through at least part of the radio access network, wherein determining the user plane path configuration for the application flow comprises negotiating the user plane path configuration between the SDN controller and an SDN agent stored locally in a memory of an end device, and wherein the SDN agent establishes, as part of the negotiating, a local table that is useable by the SDN agent, at least in part, to determine how to route packets for an application instance that utilizes the application flow;
providing the user plane path configuration to the SDN agent; and
providing the user plane path configuration to an SDN component to configure the SDN component to support the application flow based upon the user plane path configuration.

16. The computer-readable storage medium of claim 15, wherein the operations further comprise:
determining, based upon the user plane path configuration, a service edge configuration; and
providing the service edge configuration to a further SDN component to configure the further SDN component as a service edge component.

* * * * *